Dec. 9, 1941.　　　J. V. CAPUTO　　　2,265,627
ELECTRIC WELDING MACHINE
Filed Sept. 23, 1939　　　5 Sheets-Sheet 5
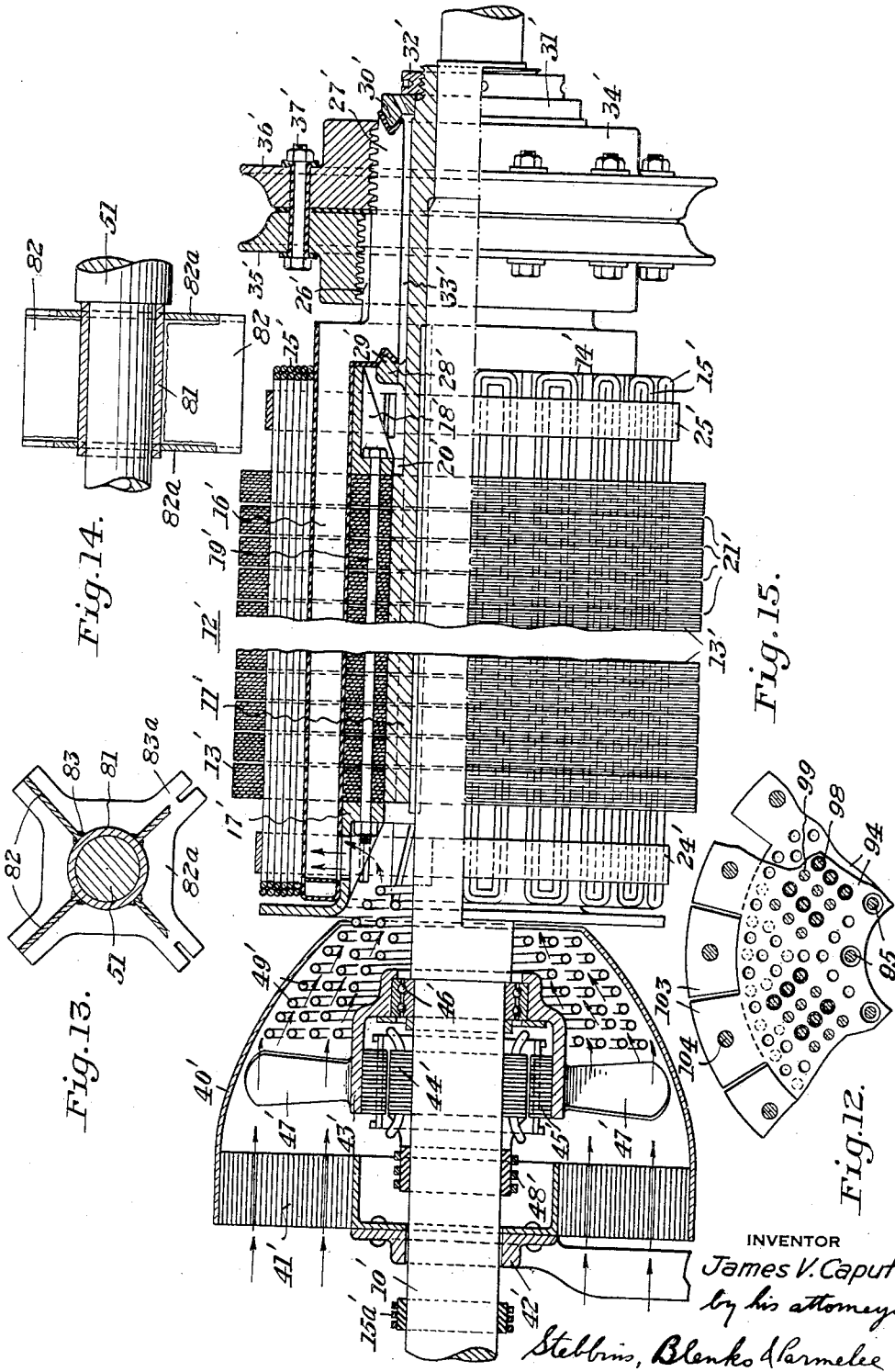
INVENTOR
James V. Caputo
by his attorneys
Stebbins, Blenko & Parmelee Patented Dec. 9, 1941

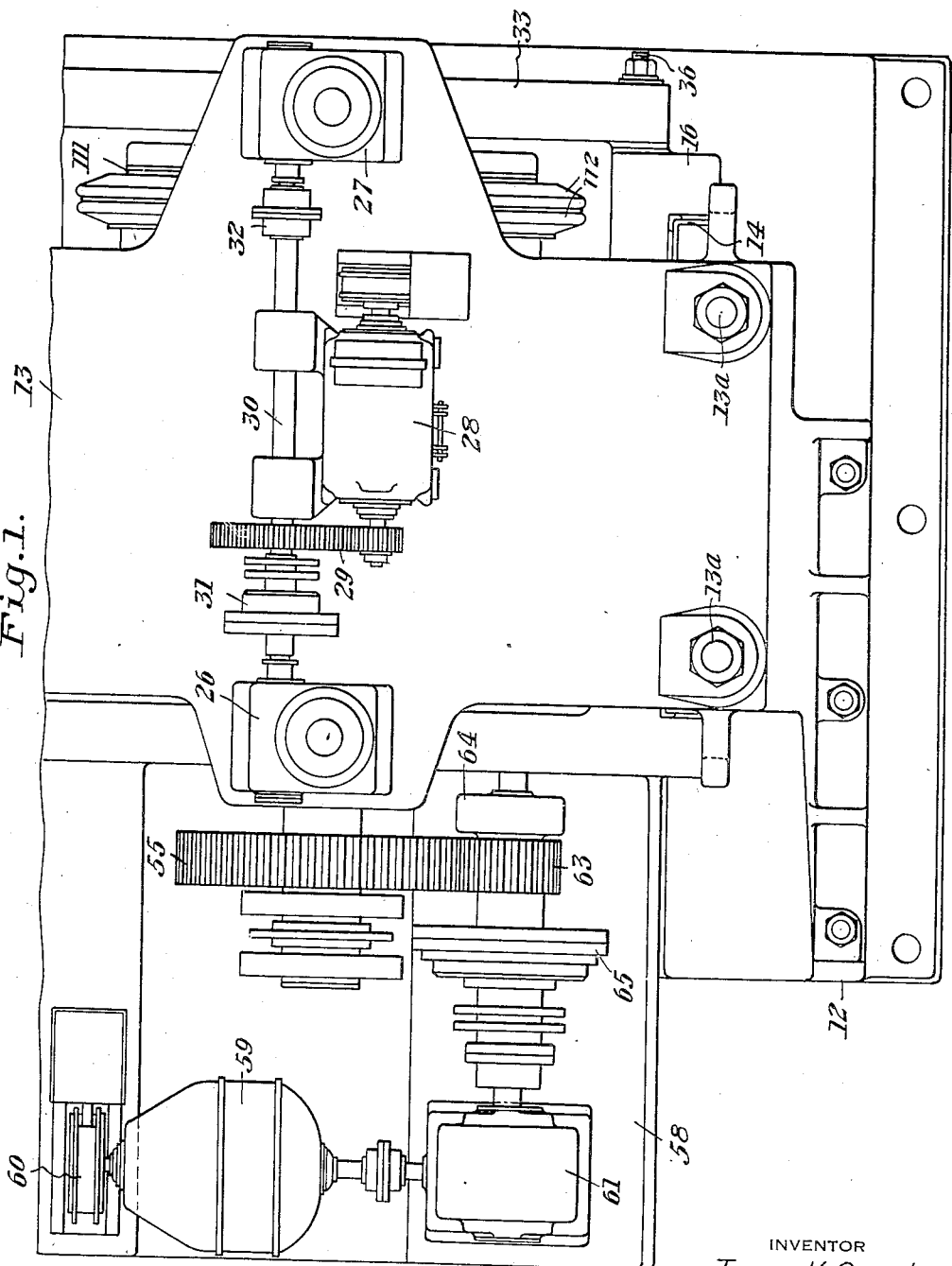

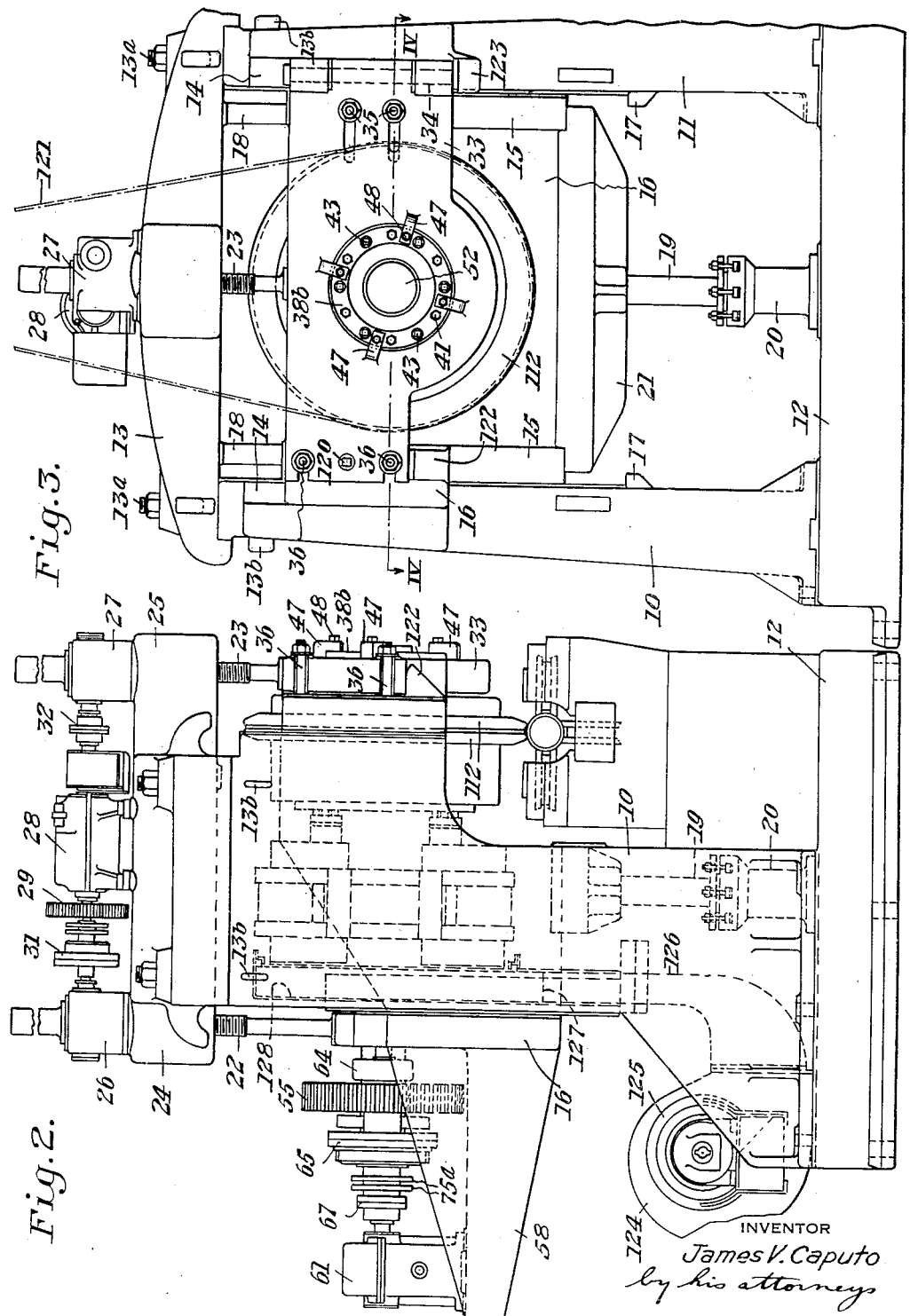

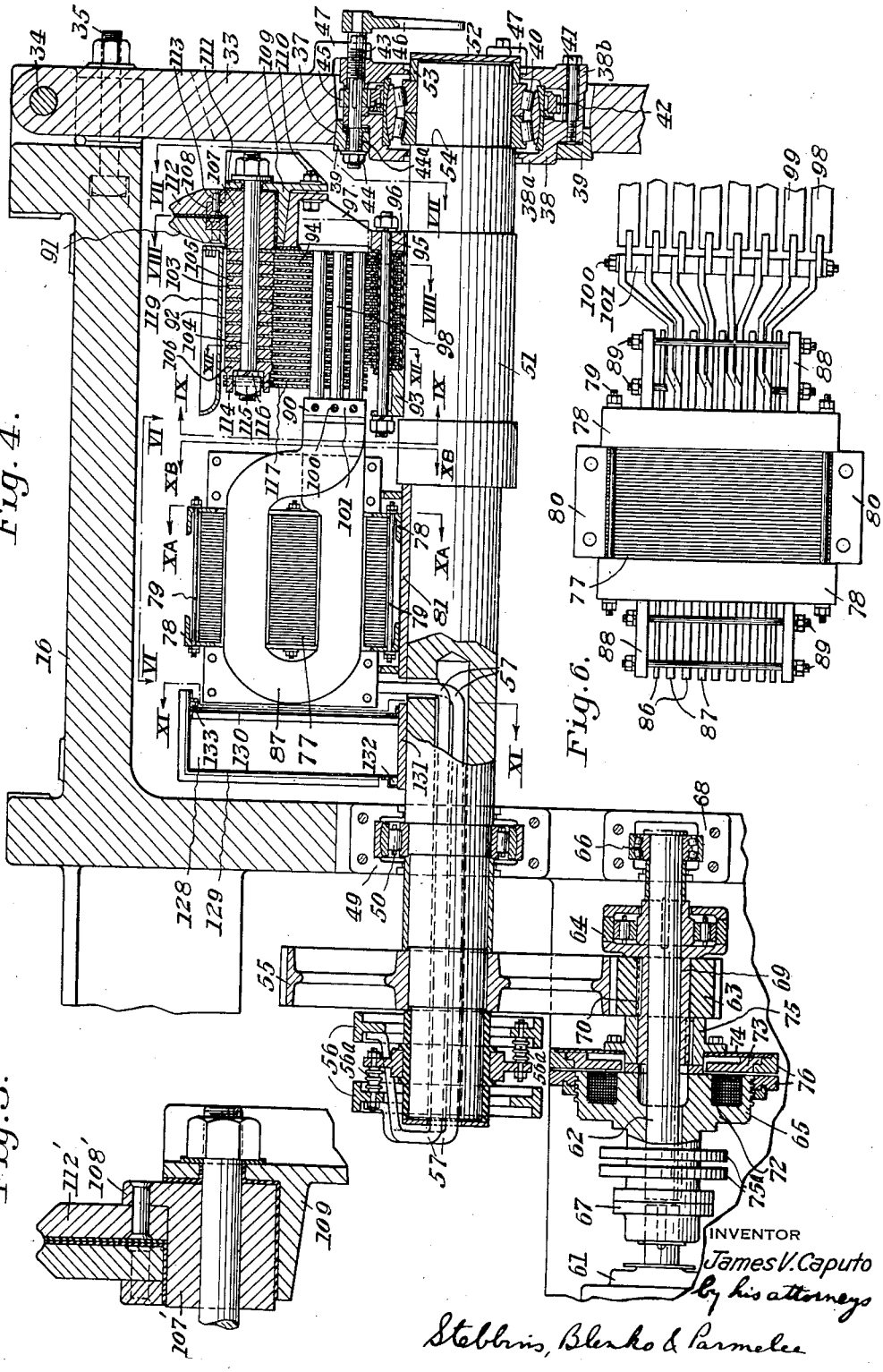

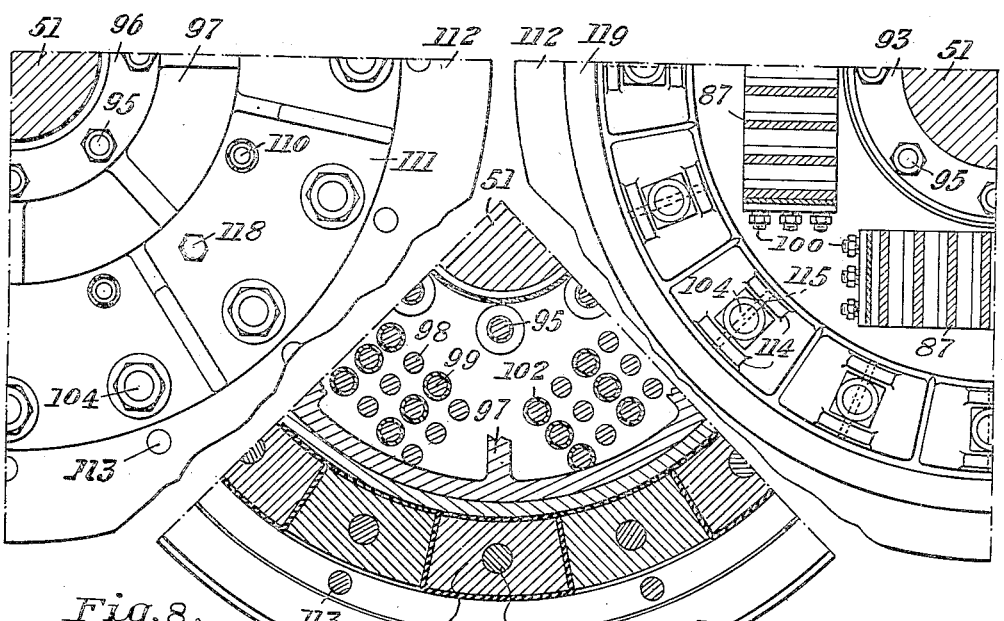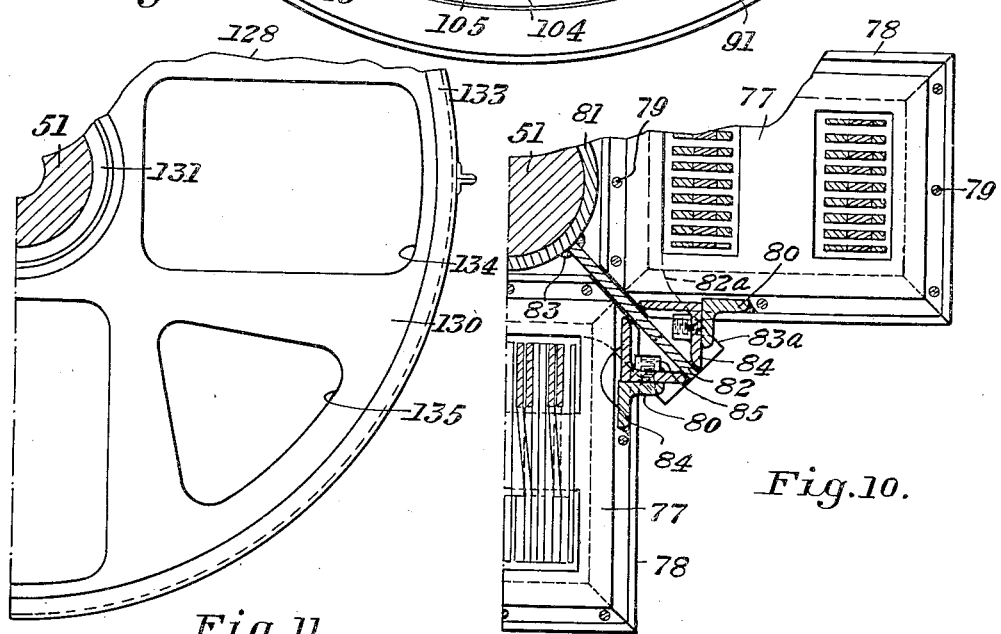

2,265,627

UNITED STATES PATENT OFFICE 2,265,627

ELECTRIC WELDING MACHINE

James V. Caputo, Crafton, Pa.

Application September 23, 1939, Serial No. 296,242

15 Claims. (Cl. 219—6)

This invention relates to electric welding and in particular to a machine for the progressive welding of seams in elongated articles such as pipe blanks or the like. The machine is of the type embodying a rotary electrode and transformers for supplying welding current thereto.

Welding machines of this type as heretofore constructed have been characterized by inaccessibility of the parts for making adjustments and for renewal, and lack of visibility of the work. Another objection to the existing type of welder is the time required to change from one electrode to another when changing the work or when the electrode is worn. Further, a transformer voltage is required which is much greater than the actual welding voltage and in many cases, several times the latter, because of the excessive impedance drop between the transformer and the work being welded. This condition is more serious in machines designed for frequencies higher than sixty cycles and for large current capacity, because the reactance drop which enters into the impedance drop increases with the frequency and the size of the conductors. The use of higher frequencies has thus been prevented to a large extent although such frequencies are desirable because they produce a continuous weld at higher speeds than the ordinary frequency of sixty cycles.

I have invented a novel electric welding machine which overcomes the aforementioned objections and is characterized by numerous additional features of novelty and advantage. In its preferred form, the invention comprises a supporting frame having a vertically adjustable carriage therein. The carriage supports the electrode, the transformers and the mechanism for driving the latter. The connections between the transformers and electrode and the construction of the electrode itself are such that the impedance drop is reduced to a minimum. The transformer voltage, therefore need only be slightly greater than the welding voltage. The construction of the electrode and the arrangement of the connections, furthermore, contribute to an increased overall efficiency by reducing the copper losses as compared with previous devices.

In order to maintain the apparatus at a safe operating temperature, I provide cooling means effective to direct streams of cooling air through the transformers and the electrode connections, and on to the electrode itself.

The electrode is supported on the carriage so as to be easily removable therefrom. At the same time, the electrode is so mounted that the pressure exerted on the work is transmitted directly to the supporting shaft. The carriage and the electrode are supported in overhanging relation to the frame, thus providing complete visibility and ready access to the work being welded. The drive for the electrode and transformers is compact to facilitate mounting on the carriage and incorporates an over-running clutch permitting the electrode to run ahead of the speed at which it is driven in order to keep up with the work advancing through the machine. At the same time, the drive embodies means for reversing the electrode when desired and for firmly holding it in fixed position when at rest.

Other novel features and advantages of the invention will become apparent during the course of the following detailed description which refers to the accompanying drawings illustrating a preferred embodiment and a modification. In the drawings, Fig. 1 is a partial plan view;

Fig. 2 is a side elevation;

Fig. 3 is a front end elevation with parts omitted for clearness;

Fig. 4 is a horizontal section through the carriage, electrode, transformers, the connections therebetween, and the drive, taken substantially on the plane of line IV—IV of Fig. 3;

Fig. 5 is a sectional view of a modification taken on a plane similar to that of Fig. 4;

Fig. 6 is a plan view of one of the transformers and its electrode connections such as would be projected on the plane of line VI—VI of Fig. 4;

Figs. 7 through 11 are partial sectional views taken along the planes of the correspondingly numbered lines of Fig. 4; the upper portion of Fig. 10 is taken along the line XA—XA and the lower portion along the line XB—XB;

Fig. 12 is a partial section along line XII—XII of Fig. 4;

Fig. 13 is a reduced transverse section showing a detail;

Fig. 14 is a reduced longitudinal section showing the same detail;

Fig. 15 is a longitudinal central section through a modified form of welding transformer, electrode and cooling means therefor.

Referring now in detail to the drawings and, for the present, particularly to Figs. 1 through 3, the welding machine is supported in a main frame including side members 10 and 11 carried on a base 12 and a cap member 13 resting on the side members. The cap member is secured to the side members by bolts 13a extending downwardly into the side members and by keys 13b extending through slots in the side members and in the bolts. By this construction, the cap member may readily be removed by removing the nuts from the bolts. The side members have ways 14 and 15 formed thereon. A carriage 16 is disposed between the side members 10 and 11 and has guided vertical movement on the ways 14 and 15. Stops 17 on the side members limit downward movement of the carriage and stops 18 on the cap member 13 limit upward movement thereof. The carriage 16 is normally urged upward by a piston 19 reciprocating in a fluid-pressure cylinder 20. The piston engages a cross beam 21 bearing on the lower edges of the carriage 16. Fluid pressure is normally maintained in the cylinder 20 by any known means sufficient to raise the carriage into engagement with adjusting screws 22 and 23.

While I have illustrated a single cylinder 20 disposed centrally of the base, certain advantages may be obtained by using a pair of cylinders, one on the outside of each of the side frames cooperating with a cross head extending through slots in the side frames. This arrangement has the advantage of greater accessibility of the cylinders for purposes of inspection or repair without dismantling or even stopping the machine. The use of a single cylinder, however, has the advantage that it may be located under the center of gravity and thus exert an accurately balanced upward force.

The screws 22 and 23 are threaded through nuts seated in the bottom of overhanging portions 24 and 25 of the cap member and held in place by machine screws. The screws 22 and 23 are splined to the worm wheels of worm drives 26 and 27 so that on operation of the latter, the screws are raised or lowered. As shown in Figs. 2 and 3, the screws 22 and 23 bear on suitable pads on the carriage 16.

The worms of the worm drives 26 and 27 are driven by a motor 28 mounted on the cap member 13 through a gear and pinion drive 29 and a cross shaft 30. A magnetic clutch 31 is disposed between the shaft 30 and the worm of drive 26 while the worm of drive 27 is coupled directly to the shaft 30 by fixed coupling 32. By this arrangement, it is possible to adjust the screw 23 relative to the screw 22 to insure that both screws engage the carriage simultaneously. To effect such adjustment, the magnetic clutch 31 is de-energized, thus permitting operation of the screw 23 without turning the screw 22.

The carriage 16 is provided at its right-hand end as viewed in Fig. 2 with a girt 33 hinged to the carriage on a pin 34. The girt is normally held against the end of the carriage 16 by bolts 35 and 36. A tapered bearing seat 37 is formed centrally of the girt 33 and a bearing housing 38 including a bearing cup 38a and a cover 38b is positioned therein by means of a plurality of segmental wedges 39. A self-alining anti-friction bearing 40 is seated in the housing 38. The bearing 40 is of the combined thrust and radial type embodying two sets of rollers inclined in opposite directions, and is held in the housing by the cover 38b which is secured to the cup member 38a by bolts 41.

A ring gear 42 is rotatable about the bearing 40 between the cup member 38a and cover 38b thereof. The segmental wedges 39 are secured by nuts 44 on the inner ends of a plurality of screw shafts 43 threaded in the cover 38b of the bearing housing and extending through a flange on the cup member 38a thereof. The inner ends of the shafts 43 are turned down and are journaled in hardened flanged bushings 44a. Pinions 45 are splined on the shafts 43 and mesh with the gear 42. The outer ends of the shafts 43 are squared to receive a wrench 46. By turning any one of the screw shafts, all of them are turned together, thus taking up or backing off all the wedges 39 to precisely the same extent.

Lugs 47 extend inwardly from the girt 33 with their inner ends overlying the cover 38b of the bearing housing. Screws 48 extending through the lugs 47 are threaded into the cover 38b to center the bearing housing axially before the wedges 39 are tightened. The lugs 47 also resist inward thrust on the bearing housing.

The carriage 16 is provided with a fixed bearing housing 49 located under the screw 22. A self-alining, anti-friction bearing 50 is disposed in the housing 49 and is of such construction that the inner race and rollers may move axially in the outer race. A main supporting shaft 51 is journaled in bearings 40 and 50. A plate 52 is secured to the end of the shaft 51 which is supported in the bearing 40. A retainer ring 53 held in place by the plate 52 together with a shoulder 54 on the shaft fixes the shaft relative to the bearing 40. In case of expansion or contraction of the shaft 51, the inner race and rollers of the bearing 50 move axially as previously mentioned to allow for such contraction and expansion. The shaft 51 supports the welding electrode, the transformers supplying current thereto and the connections between the transformers and the electrode. These elements will be described in greater detail shortly.

A driving gear 55 is keyed on the shaft 51 near the bearing 50. Slip rings 56 are mounted on the extreme end of the shaft on insulators 56a and are adapted to be engaged by the brushes supported in suitable brush rigging (not shown) for supplying high voltage currents to primary windings of the transformers through leads 57. The leads 57 are bent back; one is connected to the left-hand slip ring and the other passes through an opening in the slip ring and an opening in the supporting member, and thence connects to the right-hand slip ring with suitable lugs and bolts, in a conventional manner.

An overhanging shelf or bracket 58 extends outwardly from the left-hand of the carriage as viewed in Fig. 2 for supporting the mechanism for driving the shaft 51. This mechanism includes a motor 59 provided with a magnetic brake 60, a gear reducer 61, a driving shaft 62, a pinion 63 thereon meshing with the gear 55, an overrunning clutch 64, and a magnetic clutch 65. The shaft 62 is journaled at one end in a bearing 66 mounted on the carriage 16. The other end of the shaft is secured by a fixed coupling 67 to the slow-speed shaft of the reducer 61. The bearing 66 is a self-alining, anti-friction bearing of the combined radial and thrust type. The bearing is slidable in its housing 68 to accommodate changes in the length of the shaft 62 by reason of expansion or contraction, the other end of the shaft being fixed at coupling 67. The clutch 65 is disengaged while the shaft 51 is being driven in the forward direction. The shaft 51 is driven forward through the overrunning clutch 64 which is of the known type, comprising an internal member and an external member with rollers therebetween. The shaft 62, being driven by the motor 59 through the reducer 61, drives the internal member of the clutch 64 and through the friction rollers, the external member thereof. The internal member of the clutch is keyed on the shaft 62. The external member of the clutch is carried on a sleeve 69 which is rotatable on the shaft 62. The pinion 63 is keyed to the sleeve 69 as shown at 70. The clutch 64 is designed so that the rollers lock the internal and external members when the former is driven in such direction as to cause rotation of the shaft 51 in the forward direction. At the same time, the shaft 51 is permitted to run ahead of its drive should there be any tendency for it to do so, as for example, by engagement of the work with the electrode.

It is sometimes desirable to reverse the shaft 51. It is also desirable when the drive is stationary, that the shaft 51 be held against rotation. To accomplish these results, I utilize the magnetic clutch 65. This clutch comprises an annular magnet 72 keyed on the shaft 62 and an annular armature 73 carried on a flexible disc 74 secured to a hub 75. The hub 75 is keyed to the sleeve 69 on which the pinion 63 is also keyed. Thus when the magnet 72 is excited by energization of its coil through slip rings 75a, the shaft 62 drives the sleeve 69 through the friction surfaces of the magnetic clutch shown at 76. Since the clutch 64 is effective to drive the shaft 51 only in the forward direction, the members thereof are not locked together on reversal of the shaft 62 but are free to rotate.

The magnetic clutch 65, in addition to driving the shaft 51 in the reverse direction, is also employed to hold the shaft in fixed position when the drive is stopped. The brake 60 is effective to hold the shaft of the motor 59 against rotation as long as the motor is disconnected from its supply line. The control circuit for the clutch 65 is so arranged that its coil is energized when the motor 59 is stopped. Any tendency to turn the shaft 51 in either direction is opposed by the brake 60, the effect of which is multiplied by the gear reducer 61, the pinion 63 being locked to the shaft 62 by the clutch 65. This locking of the main shaft 51 in stationary position is especially advantageous in changing the electrode in the manner to be described later.

The construction and arrangement of the transformers may best be observed in Figs. 4, 9 and 10. As there shown, the transformers 77 are of the shell type, the cores being assembled and held between extra heavy rectangular angle iron frames 78 by through-bolts 79. Feet 80 are welded between the frames 78. A bushing 81 keyed on the shaft 51 has radial plates 82 welded edgewise thereto as at 83. Gusset plates 82a are disposed in spaced relation on the bushing 81 and welded thereto. As shown in Fig. 10, the plates 82a have radial projections 83a notched to receive a portion of the ends of the plates 82 which are notched to interfit therewith. The joints between the plates 82 and 82a are welded and the resultant structure provides a strong, rigid support for the transformers 77.

Angles 84 have their edges welded to the plates 82 as shown in Fig. 10 to provide seats for the feet 80. Bars 85 welded to the inner faces of the angles 84 extend the full length thereof. Holes are drilled through the angles 84 and bars 85 to match the holes drilled in the feet 80. The holes through the angles 84 and bars 85 are tapped to receive machine screws inserted through the holes in the feet 80 for securing the transformers firmly in proper assembled relation relative to the shaft. It will be observed that when the feet 80 seat on the angles 84, a slight clearance remains between the angle iron frames 78 and the bushing 81 and between the frames and the plates 82. By this construction, the transformers may readily be removed simply by withdrawing the screws threaded into the bars 85, being clear of the shaft and other portions of the transformer assembly at all points. A more important advantage is that the transformer mounting described above permits the outside diameter of the transformer assembly to be kept to a minimum. This is highly important for several reasons. In the first place, by keeping the outside diameter of the transformer assembly within the outside diameter of the electrodes, the parts of the pressure-roll stand (indicated diagrammatically in Fig. 1) are much more readily accessible to the operator in case of need for adjustment or removal. A further advantage is that the connections from the transformers to the conducting assembly associated with the electrode (to be described shortly) may be made simpler and shorter.

The primary and secondary windings of the transformers are shown in Fig. 6 at 86 and 87, and are fully interleaved to reduce the transformer impedance. Spacer strips of insulation are disposed between adjacent coils providing clear passages through the transformer coil for cooling air. The protruding coil ends at both ends of the transformer are held in position by braces 88 and through-bolts 89. As shown in Figs. 4 and 6, the secondary windings 87 consist of a single turn and have their terminals of opposite polarity brought out adjacent each other, one end being bent to overlap the other. The secondary turns are composed of a plurality of individual conductors in parallel secured at their ends to terminals 90. By this construction, the secondary turns may be built up from wire of square section and the completed turns exhibit a copper loss much less than a single conductor of similar capacity, due to A. C. resistance. This is particularly important when frequencies higher than sixty cycles are employed. The primary windings of the several transformers 77 are connected in series and the series-connected windings are connected to the leads 57. The series connection of the primary windings permits approximately equal secondary currents from all of the transformers. The welding current is delivered from the secondary windings of the transformers 77 to the electrode indicated generally at 91 by a conducting assembly indicated generally at 92. This assembly is mounted on a bushing 93 of non-magnetic material keyed to the shaft 51. The assembly 92 comprises a plurality of annular conducting discs 94 disposed side by side in spaced relation. These rings are assembled on the bushing 93 with an insulating sleeve therebetween. The inner edges of the discs have holes therethrough adapted to receive through-bolts 95 also of non-magnetic material with insulating sleeves thereon. Spacer discs of insulation are disposed on the sleeves surrounding the bolts 95 between adjacent discs. The through-bolts 95 extend through the inner edge of an annular spider 96 of non-magnetic material including spaced connecting ribs 97.

The discs 94 have holes therein adapted to receive studs 98 and 99. These studs are connected to terminals 90 of opposite polarities. The terminals 90 are brazed into slots in the ends of the studs 98 and 99. The terminals 90 are connected to the ends of the secondary windings by a silver-plated lap joint secured by through-bolts 100. The through-bolts 100 are insulated from the ends of the windings of the terminal 90 by suitable bushings and extend through blocks of insulation 101 between adjacent coil ends, the latter being fanned out as shown in Fig. 6, in order that the terminals 90 are properly alined with the studs 98 and 99.

The discs 94 have holes therein as shown in Fig. 8 to receive the studs 98 and 99. The studs connected to a single terminal 90 are alined in a generally radial direction and are brazed to alternate discs 94, and insulated from the remaining discs by bushings 102.

The discs 94 have peripheral notches forming circumferentially spaced tooth-like projections 103. The tooth-like projections of alternate discs 94 are alined and have holes therein adapted to receive through-bolts 104, of high conductive material and of high tensile strength. Spacer blocks 105 of conducting material are disposed on the bolts 104 between adjacent discs. These spacers will either be silver-soldered or the adjacent edges silver-plated for the purpose stated hereinafter. The remaining rings 94 have their tooth-like projections in alinement and staggered relative to the projections of the discs just mentioned. That is to say, the projections of the discs of one polarity line up with the notches in the discs of the other polarity with clearance therebetween. The disc projections and the spacer blocks 105 are clamped by the bolts 104 between segmental blocks 106 and spacer blocks 107. There are two sets of spacer blocks 107, the blocks of each set being in conductive arrangement with one of a pair of conducting rings 108. The spacer blocks on the two rings alternate circumferentially of the shaft 51 and are insulated from each other. As a result of this construction, the continuous rings 108 are of opposite polarity, the blocks 107 of each ring being in contact with all the bolts 104 in engagement with the discs 94 of the same polarity.

An electrode-supporting ring 109 is removably mounted on the spider 97, the contacting surfaces of the ring and spider being tapered as shown in Fig. 4. The ring is held on the spider by bolts 110, extending through inward flanges thereon. The ring 109 has a radial flange 111 through which the bolts 104 extend. The spacer blocks 107 are thus secured to the ring 109 but are insulated therefrom as shown. The bolts themselves are likewise insulated from the ring 109.

Annular shoes 112 are secured to the rings 108 in conducting engagement therewith but are insulated against each other. The outer peripheries of the shoes 112 are shaped to conform to the work, i. e., a tube blank or the like. The contacting surfaces of the shoes and the rings 108 are silver-plated and the shoes are held on the rings by countersunk rivets 113.

The electrode unit comprises the shoes 112, the rings 108 and their spacer blocks 107 may be removed from the conducting assembly 92 by removing the nuts on the right-hand ends of the bolts 104 as viewed in Fig. 4. The blocks 106 have lugs 114 extending outwardly therefrom. Cotter pins 115 extending through the lugs 114, the bolts 104 and the nuts on the left-hand ends thereof prevent rotation thereof when the nuts on the other ends are backed off and also prevent lateral movement of the bolts 104. A heavy-duty lock washer or spring 116 is disposed on each bolt 104 between the block 106 and the adjacent nut. This maintains uniform contact pressure regardless of the expansion of the bolt. Auxiliary discs 117 are included in the conducting assembly 92 and are connected to the studs 98 and 99 in the same manner as the discs 94. The discs 117, however, do not have the tooth-like projections 103 thereon. They serve to assist in carrying welding current from all the transformers to that point on the electrode in contact with the work, thus providing a short path around the assembly in parallel with that through the shoes 112, in accordance with the principles explained in my Patent No. 1,910,882.

By virtue of the construction of the conducting assembly 92, the size of the electrode is independent of the spacing of the transformers radially of the supporting shaft. Generally it will be desirable, as shown in Fig. 4, that the electrode extend beyond the transformers. If, on the other hand, the converse should be true, the studs 98 and 99 may traverse the discs near their outer periphery and the bolts 104 may be disposed near the inner edge of the discs.

In order to remove the electrode quickly from the spider 97, I provide screws 118 threaded through tapped holes in the inward flange of the ring 109 and bearing on the inward flange of the spider 97. By turning up these screws after removing the bolts 110, the electrode is forced off the spider 97 as a unit. The spider 97 may be provided with reinforcing ribs at the points where the screws 118 engage the inward flange thereof.

It will probably be desirable to apply cooling fluid directly to the electrode shoes 112 adjacent the point at which they engage the work. In order to protect the conducting assembly 92 from any splashing or dripping from the electrode, I provide an annular shield 119 preferably of non-magnetic sheet metal secured to the inner shoe 112 by suitable screws but insulated therefrom. Slots are formed in the left-hand edge of the shield 119 in line with the transformers 77 and provided with removable covers to permit a temporary support to be brought to bear against the conducting assembly 92 when removing the electrode. As an alternative for supporting the electrode, radial arms may be provided between the transformer and the electric conducting assembly, bearing directly on the shaft. These arms can be welded on a bushing and pressed and keyed to the shaft.

The construction which has been described hereinabove is such that removal of the electrode assembly is greatly facilitated and may be effected in a matter of a few minutes. Removal of the electrode is necessary when changing the size of the work, e. g., pipe, being welded, and also when the electrode has been worn beyond the point where it can conveniently be redressed, or when damaged for any reason.

The first step preliminary to removal of the electrode is to remove the cover from the bottom-most slot in the shield 119 and to place a temporary support such as a screw jack under the conducting assembly 92 or other suitable part of the rotating mechanism and bring it to bear against the latter. The next step is to back off the screws 22 and 23 which permits the cylinder 20 and piston 19 to raise the carriage 16 until it strikes the stops 18. Retraction of the screws is continued until the screw 23 clears the periphery of the electrode 91. The nuts are then removed from the bolts 35. The nuts on the bolts 36 are loosened and the bolts swung to one side to clear the free end of the girt 33. Before swinging the girt about the hinge pin 34, the wrench 46 is operated to turn the screw shafts 43, thereby pushing the segmental wedges 39 inwardly of their seat 37. This releases the bearing housing from the girt 33. The screws 48 are then removed to permit swinging of the girt relative to the bearing housing. A screw 120 threaded through the free end of the girt is adapted, when advanced, to bear against the adjacent end of the carriage 16 to force the free end of the girt away from the carriage, if necessary, thereby starting outward swinging movement of the girt 33 about the hinge pin 34. When the girt has been swung to a position about 90° from its normal position, ample clearance is afforded for the removal of the electrode 91.

After the girt 33 has been swung open as described, a cable sling from an overhead crane is placed around the electrode as indicated at 121 to suspend the electrode after removal. As will be apparent from Figs. 2 and 3, the sling clears all portions of the cap member 13 and associated parts which overhang the electrode so that clearance is provided all around the electrode permitting axial movement thereof when freed from the conducting assembly.

The nuts on the electrode ends of the through-bolts 104 are then removed. The bolts 110 are likewise removed. The screws 118 are then turned up by bearing on the inward flange of the spider 97 to force the ring 109 off its tapered seat on the spider. As soon as the ring 109 has been slightly shifted from its seat, it may readily be removed from the spider and transported by the crane to the desired point.

A new electrode may be secured in place by a reversal of the operations just described. The new electrode is picked up in a sling by the crane and moved to a position adjacent the spider 97. Key-ways in the contacting faces of the spider 97 and the ring 109 cooperate with a key to aline the bolt holes in the blocks 107 and the inward flange of the ring 109 with the bolts 104 and the holes in the inward flange of the spider 97. It will be understood that the screws 118 of the new electrode must be backed off to permit tight seating of the ring 109 on the spider 97. The bolts 110 are then replaced and tightened to force the ring 109 home on its seat on the spider 97. Clearance is provided between the radial faces of these parts to permit the blocks 107 to be clamped firmly with the discs 94 and spacers 105 by replacing the nuts on the electrode ends of the bolts 104. The girt 33 is then swung back to the illustrated position. Before tightening the nuts on the bolts 35 and 36, the screws 48 are replaced, thereby centering the bearing housing 38 in the girt 33. The nuts on the bolts 35 and 36 are then tightened and the wrench 46 is operated to draw the wedges 39 home against their seat 37 thereby firmly locking the bearing in the girt.

To insure perfect alinement of the girt 33 with the carriage, bearing seats 122 and 123 are disposed on the ends of the carriage. The seat 122 has a sloping upper face to position the free end of the girt vertically when it is closed. The seat 123 holds the hinged end of the girt accurately in the proper relation to the carriage. Similar seats may be disposed on the carriage above the girt, if desired.

The temporary support engaging the conducting assembly 92 or other suitable part of the rotating mechanism, is then removed and the cover replaced on the opening in the shield 119. The screws 22 and 23 are then lowered to restore the carriage to the proper working level. In restoring the carriage to the operating level, the stops 18 with finished surfaces on the carriage adapted to abut them afford convenient means for calipering to check the alinement of the machine, any necessary correction being effected by operating the screw 23 alone in one direction or the other after disengaging the magnetic clutch 31.

In order to prevent excessive temperature rise of the transformers, conducting assembly, and electrode, I provide cooling means including a blower 124 mounted on the base 12 and driven by a motor 125. The outlet of the blower is connected to a duct 126 extending upwardly toward the carriage 16. The duct 126 communicates through a telescoping joint or bellows 127 with an annular chamber 128 mounted on the shaft 51 and extending therearound. The chamber 128 includes a fixed side wall 129 and a rotating wall 130. The wall 130 is carried on a bushing 131 on the shaft 51. The joint between the wall 129 and the bushing 131 is packed as at 132. The joint between the wall 129 and the wall 130 is similarly packed at 133. The wall 130 has openings 134 in alinement with each of the transformers 77 and has additional intermediate openings 135. By this construction, the cooling air delivered by the blower 124 through the duct 126 to the chamber 128 is directed generally parallel to the shaft 51 and passes over the transformers and over and through the conducting assembly 92 and electrode 91. Suitable circumferential shields may be mounted between adjacent transformers to confine the air discharged from the openings 135 to insure that it sweeps over the conducting assembly and electrode. The conducting discs 94 and 117 are provided with suitable holes to permit passage of the cooling air therethrough. The air passing through these holes is discharged through the spider 97. The holes in the discs are so staggered as to provide radial movement of the air, away from and towards the shaft and thence out of the openings 134, to make certain that all the surfaces of the discs are swept with cooling air. The air discharged from the openings 134 passes through the cooling passages between adjacent turns of the transformer windings and between the windings and the core, as previously mentioned. By this construction, separate streams of cooling air are directed through the transformers and conducting assembly, respectively.

A modified form of electrode construction is illustrated in Fig. 5. According to this modification, blocks 107′ are cast integral with continuous rings 108′, in the same manner as the blocks 107 and 108. The rings 108′, however, are located on the outer sides of the blocks 107′ instead of intermediate the ends thereof as are the rings 108. Electrode shoes 112′ are riveted to the rings 108′, completing the electrode proper. The complete electrode is carried on the ring 109. The shoes 112′ have a shape in section different from that of the shoes 112, the shoes 112′ being annular with plane opposed faces and their edges turned down to the proper contour. The advantage of the construction shown in Fig. 5 is that turning down the electrode periphery as is necessary periodically in operation, removes less material than a similar operation on shoes of the sectional shape shown at 112. A further advantage is that the shoes 112′ have a smaller sectional area than the shoes 112 and thus require less metal.

According to a modification of the invention,

I provide an electrode comprising a pair of conducting rolls insulated from each other and suitably grooved for receiving a formed blank for welding. A rotary transformer core of cylindrical shape is mounted on a spider carried by a rotatable shaft. Primary and secondary windings are placed in axial slots in the cylindrical core to form a plurality of independent transformers. The secondary windings are constituted by hair-pin loops of copper strap and the ends of the windings are extended and suitably machined for engagement with the welding rolls previously mentioned. The rolls are thus electrically connected to the transformer secondaries and also supported mechanically. For cooling the transformer core and windings, I provide a fan on the shaft driven by an induction motor having its stator fixed thereto and its rotor rotatable thereon. This modification is also disclosed in my Patent No. 2,052,963 and claimed in my copending application Ser. No. 72,556 filed April 3, 1936, divided therefrom, of which this is a continuation in part.

The modification of the invention is illustrated in detail in Fig. 15 and comprises a shaft 10' to which is keyed a spider 11'. The spider 11' affords a support for a rotary device 12', including a core 13' of drum shape having axial slots 14' therein. Primary windings 15' and secondary windings 16' are placed in the slots 14', and are suitably insulated from each other and from the core 13'.

It will be apparent from the foregoing description that the drum core 13' and the plurality of windings 15' and 16' constitute a plurality of shell type transformers. The windings of each individual transformer, of course, pass through adjacent slots in the core 13'. The device 12' may be built up by the use of preformed primary and secondary coils around which the punched laminations constituting the core are stacked in a manner well known in the electrical art. Since the secondary windings are a single turn of copper strap, they may be inserted in the slots after the core has been built up if desired, and then wedged in place. The primary windings may also be wound through the slots by hand after the core has been formed. The device may also be built up by providing separate punchings to form the portions of the core embracing the primary and secondary windings, respectively. These punchings may be similar to those employed in the construction of an induction motor. When the laminations have been assembled and the windings inserted, the two portions may be combined by pressing the inner portion within the outer portion and securing it thereto by any convenient means.

The ends of the stacked laminations forming the core 13' are engaged by brackets 17' and 18' which are drawn together by means of clamping rods 19', which also serve to secure the core to the spider 11'. It will be noted that the spider 11' has axial channels 20' therein. The core 13' includes spacer elements (not shown) forming ducts 21' in the core. Thus air blown through the transformer core axially passes out of the conduits 21' to cool the core and windings of the transformer. Circumferential bands 24' and 25' are provided to maintain the windings in proper position. The brackets 17' and 18' have holes therein to permit cooling air to pass outwardly over the ends of the transformer coils.

The ends of the secondary windings 16', which are composed of copper bars bent to hair-pin shape, are brought out and terminals 26' and 27' are welded to the ends of each winding. The upper edges of the terminals are grooved as shown. The inner ends of the terminals 26' and 27' are likewise grooved for cooperation with a ring 28' formed integral with the spider 11'. The ring has a continuous rim 29' projecting into the grooves formed on the ends of the terminals 26' and 27'. The outer ends of the terminals 27' have a similar annular groove into which a projecting rim 30' on a collar 31' projects. The collar 31' rests on the reduced end of the spider 11' and a clamping nut 32' is threaded thereon. A conduit 33' for air currents is formed in the spider between the rings 28' and 31', said conduit extending through the ring 28', and the ring 31' may be suitably perforated to provide outlets for such currents. The terminals 26' and 27' are thus given a rigid support at both ends but are insulated from the clamping rings and from each other.

The terminals 26' and 27' form substantially grooved cylinders of different diameters since they are arranged in a circle and, although they are not continuous around the circumference, they are close enough together to provide strong support for a welding electrode 34'. The electrode 34' is made up of rolls 35' and 36'. These rolls are insulated from each other but are secured together by bolts 37'. Each roll 35' and 36' of the electrode 34' is further divided along a plane passing through the axis into two halves. These two halves are bolted together (not shown). The electrode is assembled by placing the two halves of the inner roll 35' upon the terminals 26' and bolting them together. The inner surface of the portions of the electrode are grooved for engagement with the grooved upper edges of the terminals 26'. When both rolls of the electrode 34' have thus been positioned on the terminals 26' and 27', the two rolls are bolted together. The joints between halves of each roll of the welding electrode are not parallel but are at right angles to give greater rigidity to the assembled electrode.

The primary windings of the transformers may be supplied with current through slip rings 15a'. Since the supply is single phase, only two rings will be needed for energizing the primary windings. Additional rings may be provided for taps which may be taken from the primary windings for the purpose of voltage control.

I provide means for cooling the transformer and electrode, including a shell 40' surrounding the end of the core opposite that to which the welding electrode is secured. A filter 41' is placed in the end of the shell 40'. A yoke 42' surrounding the shaft 10' supports the filter 41' and the shell 40'. An induction motor 43' has its stator 44' secured to the shaft 10', while its rotor 45' is rotatable thereon by means of bearings 46'. Fan blades 47' secured to the rotor set up a current of air as indicated by the arrows for the purpose of cooling the core and transformers. The location of the stator and rotor may, of course, be reversed from that shown. Current is supplied to the induction motor 43' through slip rings 48'. A cooling coil 49' may be employed to lower the temperature of the cooling air to the desired point.

Considering the advantages of the invention generally, the construction of the machine is such that the necessity for replacement of parts is reduced to a minimum. All the parts have been designed to give them ample strength for any load to which they may be subjected and to provide a long, useful life without necessity for frequent removal or other maintenance expense. The electrical system, furthermore, is so designed that it is able to deliver the rated amount of current and also to withstand such temporary overloads as may be imposed thereon in operation. All abutting contact areas have been made large enough to carry the required current without exceeding a desirable current density, thus keeping the heating effect to the absolute minimum.

The conducting assembly which carries the welding current from the transformers to the electrode shoes and thence to the work, is constructed so that its impedance is very much less than that of previous welding machines. The ratio of reactance to resistance is less than unity, as compared to a ratio of 6 or 8 for machines previously known and the impedance is correspondingly reduced. The machine is adapted for efficient operation at frequencies in excess of sixty cycles, e. g., 240 cycles. Even at the higher frequency, the ratio of reactance to resistance of the conducting assembly is not more than 2½ or 3 and the impedance is maintained at a correspondingly low value. The resistance drop at the higher frequency is only slightly higher than at sixty cycles.

By reason of the exceedingly low impedance of the electrical connections, the transformer voltage required is only slightly higher than the actual welding voltage. In a typical design, for example, for sixty cycles, for a welding voltage of about 8.7, a transformer voltage of only about 9.7 is sufficient, a ratio of about 1.1, as compared to a ratio of about 2 for welding machines now in use. At higher frequencies such as 240 cycles, the machine of my invention requires a transformer voltage of about 9 volts for a welding voltage of slightly over 5 volts, as compared to a transformer voltage of 27 volts for a welding voltage of 4½ volts in a welder of the type employed heretofore. The figures quoted for the machine of my invention may be further improved by a slight refinement, viz., silver soldering the contacting surfaces of the discs 94 and spacer blocks 105. At 60 cycles this reduces the resistance drop from about 0.217 volt to 0.018 volt and effects a corresponding reduction in the copper loss, e. g., from 10,900 watts to 930 watts. At 240 cycles the resistance drop is reduced from 0.236 volt to 0.037 volt and the copper loss is reduced from 11,800 watts to 1,860 watts.

A further advantage lies in the unit-type construction of the transformers, conducting assembly and electrode and support therefor. This unitary construction permits the removal of any one of these without dismantling the whole machine. Further, the machine can be operated at a reduced capacity, if desired, while some of the units are being removed or are disconnected from the electrode. In other words, the unit-type construction permits operation of the machine at various capacities, whereas any failure of the single-unit transformer as used heretofore makes the machine entirely inoperative; and the replacement of such transformer is a long, tedious job. On the contrary, the transformers of my machine may be replaced in a very short time.

The ability to remove the electrode quickly and easily is an outstanding advantage from the operating standpoint. The removal of the electrode does not require skilled workmen because all fits are such that replacement of the electrode does not require any special adjustment of cooperating parts as these parts fit readily together.

The construction of the electrode assembly is such that all mechanical strains are concentrated radially of the shaft without affecting transmission of current to the conducting assembly and the work from the transformer.

This machine permits the use of high frequency with a very low overall voltage drop, reducing the wattless power in-put required. The reduction in wattless power in this particular machine is 850 k. v. a. at 240 cycles, or 500 k. v. a. as compared with 1,350 k. v. a. for prior machines.

The welder of my invention, furthermore, has a high efficiency, viz., about 92% at full load, and even higher at lower loads. All parts of the welder, in addition, are characterized by a very low rate of depreciation. About the only maintenance expense normally to be expected is the wear on the electrode which is dependent on the tonnage produced.

I claim:

1. In a welder, a frame comprising spaced supporting standards, a cap member thereon, a carriage slidable vertically on said standards, means below said carriage for elevating it, screws on said cap member for lowering the carriage, said cap member and carriage having portions overhanging beyond said standards, and a welding electrode journaled in said carriage adjacent the overhanging portion thereof, one of said screws extending through the overhanging portion of the cap member and engaging the overhanging portion of the carriage, whereby the electrode may be supported in a suspending sling during removal.

2. In a welder, a frame, a carriage slidable vertically on said frame, a girt hinged to one end of said carriage, a bearing on the carriage, a bearing on said girt, a shaft journaled in said bearings and an electrode on said shaft.

3. In a welder, a frame, a carriage slidable vertically on said frame, one end of said carriage being hinged to swing open, bearings on said carriage, one of said bearings being on said hinged end, a shaft journaled in said bearings and an electrode on said shaft.

4. In a welder, a frame, a carriage slidable vertically on said frame, one end of said carriage being hinged to swing open, bearings on said carriage, one of said bearings being removably secured to said hinged end, means for centering the bearing on said hinged end, a shaft journaled in said bearings, and an electrode on said shaft.

5. A welding device comprising a base, side members on the base and a cap on the side members, a carriage slidable on said members, said carriage being in the form of a yoke open at one end, a girt secured to the open end of said carriage with a bearing therein, a second bearing on said carriage, and a shaft journaled in said bearings, said girt being disengageable from the carriage to permit removal of the electrode.

6. In a welder, a supporting shaft, a sleeve on said shaft, gusset plates on said sleeve in planes perpendicular to the axis thereof, radial supporting plates secured to said sleeve and gusset plates, transformers detachably mounted on said supporting plates, an electrode on said shaft and connections from said transformers to said electrode.

7. In a welder, a supporting shaft, a sleeve on said shaft, radial supporting plates secured to said sleeve, transformers detachably mounted on said supporting plates, an electrode on said shaft and connections from said transformers to said electrode.

8. In a welder, a supporting shaft, a sleeve on said shaft, radial supporting plates secured to said sleeve in circumferentially spaced relation, transformers disposed between adjacent plates and detachably secured thereto.

9. In a welder, a rotary electrode, current-supply connections extending laterally of said electrode, and a sheet-metal cylinder secured to said electrode for rotation therewith outwardly of said connections and extending laterally from the electrode, thereby protecting said connections from drippings of cooling fluid supplied to the electrode.

10. A welding device comprising a base, side members and a cap resting on said side members, a carriage slidable on said members, said carriage being in the form of a yoke open at one end, a girt secured to the open end of said carriage with a bearing therein, a second bearing on said carriage, a shaft journaled in said bearings, said girt being disengageable from the carriage to permit removal of the electrode, and means for removably securing the first-mentioned bearing on said girt.

11. A welding device comprising a base, side members disposed thereon and a cap seated on said side members, a carriage slidable on said members, said carriage being in the form of a yoke open at one end, a girt secured to the open end of said carriage with a bearing therein, a second bearing on said carriage, a shaft journaled in said bearings, said girt being disengageable from the carriage to permit removal of the electrode, a plurality of wedges for removably securing the first-mentioned bearing to the girt, and means for simultaneously actuating said wedges.

12. In a welder, a frame comprising spaced side members having overhanging portions, a cap member thereon, a carriage slidable vertically on said side members, means below said carriage for elevating it, screws on said cap member for lowering the carriage, said cap member and carriage having overhanging portions between said side members, and a welding electrode journaled in said carriage between the overhanging portions of said side members, whereby the electrode may be supported in a suspending sling during removal from the carriage.

13. In a welder, a frame comprising spaced supporting standards, a cap member thereon, a carriage slidable vertically on said standards, a hydraulic lift below said carriage constantly urging it upwardly, screws on said member for lowering it against the force exerted by said lift, a welding electrode journaled in said carriage, and means for arresting upward movement of said carriage on retraction of the screws to a predetermined point, whereupon the carriage remains stationary while said screws are further retracted to permit axial removal of the electrode.

14. Rotary welding apparatus comprising a shaft, transformers and a twin-disc electrode mounted on said shaft in spaced relation, a plurality of connecting discs disposed in spaced relation axially of the shaft between said transformers and electrode, studs and bolts extending through said connecting discs at different radial distances from the shaft and in contact with alternate discs, respectively, said studs being secured to the terminals of the secondary windings of the transformers and said bolts extending through the electrode discs and in contact with one of them, the outer peripheries of said discs having tooth-like projections spaced circumferentially thereof, the discs being so disposed that the projections of adjacent discs are staggered, said bolts extending through said projections.

15. Rotary welding apparatus comprising a shaft, transformers and a twin-disc electrode mounted on said shaft in spaced relation, a plurality of connecting discs disposed in spaced relation axially of the shaft between said transformers and electrode, studs and bolts extending through said connecting discs at different radial distances from the shaft and in contact with alternate discs, respectively, said studs being secured to the terminals of the secondary windings of the transformers and said bolts extending through the electrode discs and in contact with one of them, the outer peripheries of said discs having tooth-like projections spaced circumferentially thereof, the discs being so disposed that the projections of adjacent discs are staggered, said bolts extending through said projections, and conducting spacer blocks between adjacent projections.

JAMES V. CAPUTO.